United States Patent [19]

Wardle et al.

[11] Patent Number: 4,988,797

[45] Date of Patent: Jan. 29, 1991

[54] CATIONIC POLYMERIZATION OF CYCLIC ETHERS

[75] Inventors: Robert B. Wardle; Jerald C. Hinshaw, both of Logan, Utah

[73] Assignee: Thiokol Corporation, Ogden, Utah

[21] Appl. No.: 323,588

[22] Filed: Mar. 14, 1989

[51] Int. Cl.$^5$ .................... C08G 65/10; C08G 65/18; C08G 65/20
[52] U.S. Cl. .................................. 528/408; 528/409; 528/410; 528/411; 528/412; 528/414; 528/416; 528/417; 568/617; 568/618
[58] Field of Search ............... 528/408, 409, 410, 411, 528/412, 414, 416, 417; 568/617, 618

[56] References Cited

U.S. PATENT DOCUMENTS

| | | | |
|---|---|---|---|
| 3,112,280 | 11/1963 | Farthing | 528/417 X |
| 3,925,484 | 12/1975 | Baker | 568/617 |
| 4,331,583 | 5/1982 | Everett | 528/408 X |
| 4,393,199 | 7/1983 | Manser | 528/409 X |
| 4,483,978 | 11/1984 | Manser | 528/417 X |
| 4,510,333 | 4/1985 | Pruckmayr | 568/617 |
| 4,762,951 | 8/1988 | Mueller | 528/417 X |
| 4,792,627 | 12/1988 | Aoshima et al. | 528/417 X |

Primary Examiner—Earl Nielsen
Attorney, Agent, or Firm—Wayne Nacker; Allen H. Erickson; Gerald K. White

[57] ABSTRACT

Cyclic ethers having 4 and 5 member rings are polymerized with a alcohol initiator and an acid catalyst. The acid catalyst is used at a molar ratio relative to hydroxyl groups of the alcohol initiator of between about 0.05:1 and about 0.5:1.

11 Claims, No Drawings

CATIONIC POLYMERIZATION OF CYCLIC ETHERS

The present invention is directed to an improved method of carrying out cationic polymerization of cyclic ethers, particularly cationic polymerization of oxetanes and substituted and unsubstituted tetrahydrofuran.

BACKGROUND OF THE INVENTION

U.S. Pat. Nos. 4,393,199 and 4,483,978, the teachings of which are incorporated herein by references, are directed to a method of cationic polymerization of cyclic ethers in which a polyhydric alcohol, e.g., a diol, is mixed with a cyclic ether monomer(s) and an acid catalyst. Polyethers formed from oxetane and tetrahydrofuran (THF) monomers are also described, for example, in U.S. Pat. Nos. 4,405,762 and 4,707,540, the teachings of which are incorporated herein by reference.

Polymers produced by cationic polymerization of cyclic ethers are useful for forming cross-linked elastomers. Such elastomers are useful, for example, for forming elastomeric binders for high-energy compositions, such as propellants, explosives, gasifiers or the like. In high-energy compositions, the cross-linked elastomer carries and spatially immobilizes large amounts of solid particulates, such as fuel particulates and oxidizer particulates. The high-energy composition may also contain a plasticizer for the elastomer.

A problem with known methods of cationic polymerization, such as taught by above-referenced U.S. Pat. Nos. 4,393,199 and 4,483,978, is that it is difficult to adequately control the reactions. Generally, cationic polymerization involves initiation using a preinitiator which is a polyhydric alcohol, e.g., a diol, such as butanediol, in conjunction with an acid catalyst, such as borontrifluoride ($BF_3$) or an etherate of borontrifluoride. Ideally, polymerization proceeds from each hydroxyl group of the alcohol, e.g., from both ends of a diol. By this process, the polyhydric alcohol becomes incorporated within the polymer molecule. Unfortunately, using the above referenced cationic polymerization methods, polymerization frequently proceeds from less than all of the hydroxyl groups of a polyol molecule; for example, if a diol is used as an initiator, a significant proportion of the polymer molecules have the diol at one of the termini of the polymer chain due to polymerization proceeding from one hydroxyl group only. Inconsistent polymerization patterns result in high polydispersity, i.e., variation in the chain length of the polymer molecules. Often, not all of the alcohol initiator is incorporated, resulting in a molecular weight significantly different than that desired.

Both the lack of uniformity iu chain length (high polydispersity) and lack of full incorporation of the polyol into the polymer chain are considered disadvantageous with respect to forming cross-linked elastomers, e.g., through curing with polyfunctional isocyanates. Terminal hydroxyl groups on the initiator polyol residues are likely to have substantially different reactivity with the crosslinker than have the terminal hydroxyl groups of cyclic ether residues. A primary hydroxyl group at the end of a straight chain alcohol can be expected, for example, to react much more readily with isocyanate groups than do sterically hindered hydroxyl groups of residues of substituted oxetanes. Thus, terminal initiator derived molecules may give rise to unpredictable cross-linking reactions.

Also, many mechanical and elastomeric properties of cross-linked elastomers depend upon the length of the polymer molecules between the cross links. High polydispersity may give rise to unpredictable mechanical and elastomeric properties of cross-linked elastomers.

Cationic polymerization may also be used for forming a polymer having a hydroxyl group at one end only. However, heretofore, it has been difficult to obtain polymer having a single terminal hydroxyl group and uniform chain length by the above referenced cationic polymerization method. Monofunctional (hydroxyl) polymer has application with respect to forming ABA triblock and $A_nB$ star polymers by block linking techniques, such as that taught in U.S. Pat. No. 4,806,613 issued Feb. 21, 1989 to Wardle, the teachings of which are incorporated herein by reference.

There remains a need, therefore, for improved methods of cationic polymerization of cyclic ethers which provide for greater control of the polymerization reaction.

SUMMARY OF THE INVENTION

The invention relates to an improvement in cationic polymerization of cyclic ethers which are grown as pseudo-living polymers from the hydroxyl groups of simple alcohols, diols and alcohols having higher hydroxyl functionality. In this general type of reaction, an acid catalyst is reacted with the alcohol to form an adduct which is referred to as the initiator. This adduct complexes with a cyclic ether monomer to form an activated cyclic ether. Because less than one-half of an equivalent of acid catalyst is employed for each hydroxyl functionality, a large amount of free alcohol is not complexed and, therefore, is available in the reaction mixture at all times. The hydroxyl groups of the alcohol then react with activated cyclic ether monomers, opening the rings and resulting in terminal hydroxyl groups being on the exposed ends of the (formerly-cyclic) ether residues. These resulting species are the propogating chain. The hydroxyl groups at the end of the polymer chain attack further activated cyclic ether monomers, opening the rings and again leaving terminal hydroxyl groups. These species are referred to herein as pseudo-living polymers. Polymerization proceeds in this manner until substantial exhaustion of cyclic ether monomers or until the reaction is terminated in another manner.

In accordance with the present invention, the acid catalyst is employed at a level at between about 0.05 and about 0.5 equivalents relative to the hydroxyl functionality of the alcohol. Thus, if the alcohol is a diol, the acid catalyst is used at between about a 0.10 to about a 1 molar ratio relative to moles of the diol. The reaction, which uses substantially lower levels of acid catalyst relative to hydroxyl groups than that taught in the prior art, is more controllable than prior art reactions, achieves greater incorporation of the polyfunctional alcohol within the polymer chain and provides a substantially lower polydispersity.

DETAILED DESCRIPTION OF CERTAIN PREFERRED EMBODIMENTS

The invention is directed to polymerization of cyclic ethers, including rings of from 3 to 8 atoms. Particularly, the invention is directed to cationic polymerization of oxetane, substituted oxetanes, tetrahydrofuran, and substituted tetrahydrofurans, i.e., cyclic ethers having 4 and 5 member rings. Suitable substituted oxetanes and tetrahydrofurans are described. for example, in referenced U.S. Pat. Nos. 4,483,978 and 4,707,540. Polymerizations in accordance with the invention may be conducted with a single monomer species or a mixture of monomer species. It is common, for example, to copolymerize THF and a substituted oxetane monomer.

Oxetane and tetrahydrofuran monomer units used in forming the blocks of the present invention have the general formulae:

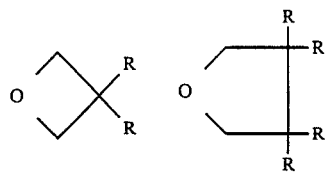

wherein the R groups are the same or different and are selected from moieties having the general formulae:

—$(CH_2)_nX$, where n is 0–10 and X is selected from the group consisting of —H, —$NO_2$, —CN, —Cl, —F, —O—alkyl, —OH, —I, —$ONO_2$, —$N(NO_2)$-alkyl, —C≡CH, —Br, —CH=CH(H or alkyl), —O—CO—(H or alkyl), —$CO_2$—(H or alkyl), —N(H or alkyl)$_2$, —O—$(CH_2)_{1-5}$—O—$(CH_2)_{0-8}$—$CH_3$, and $N_3$.

Examples of oxetanes used in forming block polymers in accordance with the invention include but are not limited to:

| | |
|---|---|
| DMO | 3,3-dimethyl oxetane |
| BEMO | 3,3-bis(ethoxymethyl)oxetane, |
| BCMO | 3,3-bis(chloromethyl)oxetane, |
| BMMO | 3,3-bis(methoxymethyl)oxetane, |
| BFMO | 3,3-bis(fluoromethyl)oxetane, |
| HMMO | 3-hydroxymethyl-3-methyloxetane, |
| BAOMO | 3,3-bis(acetoxymethyl)oxetane, |
| BHMO | 3,3-bis(hydroxymethyl)oxetane, |
| OMMO | 3-octoxymethyl-3-methyloxetane, |
| BMEMO | 3,3-bis(methoxyethoxymethyl)oxetane, |
| CMMO | 3-chloromethyl-3-methyloxetane, |
| AMMO | 3-azidoethyl-3-methyloxetane, |
| BIMO | 3-3-bis(iodomethyl)oxetane, |
| IMMO | 3-iodomethyl-3-methyloxetane, |
| PMMO | 3-propynomethylmethyloxetane, |
| BNMO | 3,3-bis(nitratomethyl)oxetane, |
| NMMO | 3-nitratomethyl-3-methyloxetane, |
| BMNAMO | 3,3-bis(methylnitraminomethyl)oxetane, |
| MNAMMO | 3-methylnitraminomethyl-3-methyloxetane, and |
| BAMO | 3,3-bis(azidomethyl)oxetane. |

The polymers are grown from an alcohol. The number of functional hydroxyl groups on the alcohol generally determines the functionality of the polymer chain which grows therefrom; thus, a diol will give rise to a difunctional polymer, a triol to a trifunctional polymer, etc. Preferably, the hydroxyl groups of the polyol are generally unhindered. Suitable diols include, but are not limited to ethylene glycol, propylene glycol, 1,3-propanediol, and 1,4-butanediol. Suitable triols include, but are not limited to glycerol, trimethylopropane and 1,2,4-butanetriol. A suitable tetraol is, but is not limited to, 2,2'(oxydimethylene)bis(2-ethyl-1,3,propanediol).

A monofunctional polymer may be formed using a monofunctional alcohol as an initiator. Although a simple alkyl alcohol, such as methanol or ethanol, will give rise to some monofunctional polymer, it is found that superior results are achieved if the initiator alcohol is a primary alcohol with the hydroxyl group on a carbon vicinal to an unsaturated bond. Examples of preferred monofunctional alcohol initiators are benzyl alcohol and allyl alcohol. Good yields of monofunctional polymer with low polydispersity are achieved through such initiators.

The acid catalysts may be chosen from among those known in the art, including Lewis acids, such as $AlCl_3$, $BF_3$, $TiCl_4$, $ZnI_2$, $SiF_4$, $SbF_5$, $PF_5$, $AsF_5$, and $SbCl_5$, and strong acids such as $FSO_3H$, $ClSO_3H$, $HClO_4$, $HIO_4$, and $CF_3SO_3H$. The acid catalyst forms a preinitiator adduct with the polyol, for example, butanediol (BDO) is known to form an adduct with boron trifluoride ($BF_3$); BDO/$BF_3$ displacing a proton on the alcohol to form the initiator adduct.

In accordance with the invention, the acid catalyst is used at a much lower level relative to hydroxyl groups of the polyhydric alcohol than is taught in the prior art. Above-referenced U.S. Pat. No. 4,393,199 teaches that a ratio of diol to a Lewis Acid, i.e., butanediol to $BF_3$-etherate to form a butanediol/$BF_3$ initiator species, should be about 1:2, which is about 1 mole of $BF_3$ for each mole of hydroxyl groups. In Example 6, U.S. Pat. No. 4,393,199 teaches that no polymerization occurs if the ratio of butanediol to $BF_3$ is 1:1. In direct contrast to the teachings of the U.S. Pat. No. 4,393,199, it is discovered that a much more controlled reaction occurs if a Lewis acid is used at a molar ratio relative to hydroxyl groups of the polyhydric alcohol of 0 5:1 or less, i.e., from about 0.05:1 to about 0.5:1. If a proton acid is used as the initiator, the ratio of hydrogen ions released by the acid catalyst to the hydroxyl groups of the alcohol is from about 0.05:1 to about 0.5:1. By using a substantially lower level of acid catalyst, incorporation of a greater percentage of the polyhydric alcohol molecules within polymer molecules is achieved and lower polydispersity is achieved.

The invention will now be described in greater detail by way of specific examples:

General Experimental Information:

Methylene chloride was distilled from phosphorus pentoxide under argon immediately prior to use. Butanediol, benzyl alcohol, BEMO and other non-energetic oxetane monomers were distilled from calcium hydride under argon or vacuum, as appropriate, and stored in sealed containers until used. BAMO and NMMO were purified and dried by passing through a column of neutral or basic alumina immediately prior to use. Reactions were run under an atmosphere of argon or nitrogen which had been dried by passage through a drying tower filled with anhydrous $CaSO_4$. Reaction flasks were heat dried under vacuum and purged with argon or nitrogen and evacuated under high vacuum several times using a manifold system. Syringes and reaction flasks were dried at least 12 hours in an oven (110°–120° C.) and cooled in a dessicator over anhydrous $CaSO_4$ prior to use. Proton nuclear magnetic resonance (NMR) spectra were recorded with a Varian XL-300 spectrometer at 300 MHz

EXAMPLE 1

Solution Polymerization [e.g., BEMO, BMMO, OMMO/BMMO, BFMO/BEMO, BAMO/BMNO, BNMO/NMMO. etc.]

100 g of dry methylene chloride is charged into a flame-dried, 500 ml resin flask which is maintained under a nitrogen atmosphere. To this flask is then added the calculated amount of freshly distilled 1,4.butanediol (BDO) followed by the calculated amount of borontrifluoride-etherate (0.10:1 mole ratio). This solution is allowed to react for 1 hr. at room temperature. The reactor is then cooled to 0° C., and after 30 min., a solution of the monomer(s) is added dropwise in methylene chloride (25-95 percent w/w concentration). The rate of addition usually ranges from 20 min. to 2 hrs. If the rate of polymerization is unknown, the reaction is followed by gas chromatography (GC) or nuclear magnetic resonance (NMR), until a conversion of greater than 95 percent is measured. At this time, the contents of the flask are quenched with 50 ml of saturated bicarbonate solution. The organic phase is dried over magnesium sulfate, and evaporated to dryness at room temperature. The nature of the polymer dictates the method of purification.

EXAMPLE 2

Bulk (neet) polymerization [e.g., BAMO/THF, BFMO/THF, AMMO/THF, BEMO/THF, BMMO/THF, OMMO/THF, BMEMO/THF, etc.]

Into a 500 ml, flame-dried resin flask, which is maintained under a nitrogen atmosphere, is charged a calculated amount of freshly distilled THF. While maintaining the flask at room temperature, a calculated amount of freshly distilled 1,4-butanediol is added followed by a calculated amount of borontrifluoride-etherate to provide a 0.10:1 molar ratio (the amount of BDO controls the final molecular weight). The flask is then cooled to 0° C., and after 60 min., the calculated amount of the second monomer is added in bulk. The rate of addition is governed by the reactivity ratio of the monomer pair, i.e., if the reactivity ratio of the second monomer is significantly different (higher) than that of THF, then the rate of addition is slower. The mole fraction of monomer 2 is maintained in the polymerization at a level which will give an apparently idealized copolymerization at the desired monomers-in-polymer composition. If the rate of polymerization is unknown, the polymerization is followed by GC or NMR, until a conversion of greater than 95 percent is measured. At this time, the polymerization is quenched, first by the addition of 100 ml of methylene chloride, followed by the addition to 50 ml of saturated bicarbonate solution. The organic layer is then separated, dried over magnesium sulfate, and then evaporated to dryness.

EXAMPLE 3

Preparation of a Difunctional BEMO Polymer

To a stirred solution of 0.591 ml 16.67 mmol) of butanediol in 135 ml of $CH_2Cl_2$ were added 0.082 ml (0.67 mmol) of borontrifluoride-etherate. After 20 min., the solution was cooled to 0° C., and 41 9 ml (229 7 mmol) of BEMO were added. The resulting solution was allowed to warm to room temperature. After 68.5 h., a small aliquot was removed and diluted with $CDCl_3$. NMR analysis of this aliquot showed 98.25% of the BEMO converted to polymer. The bulk solution was diluted with 300 ml of $CH_2Cl_2$ and 120 ml of saturated aqueous $NaHCO_3$. The phases were separated, and the aqueous phase was extracted with 120 ml of $CH_2Cl_2$. The combined organics were dried ($MgSO_4$); then the solvent was removed under reduced pressure to afford 39 8 g of a white, crystalline solid (98.0% yield). The material exhibited the following physical properties:

| PROPERTY | VALUE |
| --- | --- |
| Target Molecular Weight | 6098 |
| Hydroxyl Equivalent Weight | 2762 |
| NMR Molecular Weight | 5746 |
| Diols/Chain | 0.908 |
| Diol Incorporated | 0.902 |
| GPC Mw | 6410 |
| GPC Mn | 3740 |
| GPC Mw/Mn | 1.71 |

EXAMPLE 4

Preparation of a Trifunctional BAMO Polymer

To a stirred solution of 0.134 g (1.00 mmol) of trimethylolpropropane in 12.6 ml of $CH_2Cl_2$ were added 0.0615 ml (0.50 mmol) of boron trifluoride etherate. After 0.5 h., 6.9 ml (50.0 mmol) of BAMO were added. After 61 h., a small aliquot was removed and diluted with $CDCl_3$. NMR analysis of this aliquot showed 96.1% of the BAMO converted to polymer. The reaction solution was diluted with 50 ml of $CH_2Cl_2$ and 20 ml of saturated aqueous $NaHCO_3$. The phases were separated, and the aqueous phase was extracted with 20 ml of $CH_2Cl_2$. The combined organics were dried ($MgSO_4$); then the solvent was removed under reduced pressure to afford 8.3 g (97.2% yield) of a white crystalline solid. The material exhibited the following physical properties:

| PROPERTY | VALUE |
| --- | --- |
| Target Molecular Weight | 8400 |
| Hydroxy Equivalent Weight | 2174 |
| NMR Molecular Weight | 6870 |
| Triols/Chain | 0.895 |
| Triol Incorporated | 1.033 |
| Triol Internal | >0.98 |
| GPC Mw | 6350 |
| GPC Mn | 3860 |
| PC Mw/Mn | 1.64 |

EXAMPLE 5

Preparation of a Tetrafunctional BAMO/NMMO Polymer

To a stirred solution of 0.25 g (1.00 mmol) of 2,2'(oxydimethylene)bis(2-ethyl-1,3-propanediol) in 24 ml of $CH_2Cl_2$ were added 0.123 ml (1.00 mmol) of boron trifluoride etherate. Nearly all of the tetraol was dissolved at this time. After Z0 min, 8.7 6 g (5Z.1 mmol) of BAMO and 3.24 g (22.0 mmol) of NMMO were added at one time. After 1 hour more, no undissolved initiator is visible. After 24 hours, a small aliquot was removed and diluted with $CDCl_3$. NMR analysis of this aliquot showed 91.8% conversion of BAMO to polymer (NMMO conversion similar). After 24 hours more, the reaction mixture was diluted with 50 ml of $CH_2Cl_2$, and 25 ml of saturated aqueous $NaHCO_3$. The phases were separated and the aqueous phase was extracted with 50 ml of $CH_2Cl_2$. The combined organics were dried ($MgSO_4$); then the solvent was removed under reduced pressure to afford 11.9 g (97.1%) of a pale yellow oil. The material exhibited the following properties:

| PROPERTY | VALUE |
| --- | --- |
| Target Molecular Weight | 12237 |
| Hydroxyl Equivalent Weight | 2717 |

-continued

| PROPERTY | VALUE |
| --- | --- |
| NMR Molecular Weight | 11146 |
| Tetraol/Chain | 0.95 |
| Tetraol Incorporated | 0.99 |
| Tetraol Internal | >0.95 |
| GPC Mw | 8650 |
| GPC Mn | 5360 |
| GPC Mw/Mn | 1.61 |

EXAMPLE 6

The following Table summarizes the physical/chemical characteristics of some experimental tetrafunctional; poly-BAMO oxetane polymers. These data show the high degree of initiator incorporation, the molecular weight control, and the functionality achieved with these materials using the tetrafunctional initiator. An additional tetrafunctional BAMO/NMMO copolymer has also been prepared, and its properties are also summarized in the Table (last column). The properties verify that the intended structure was achieved and that a completely controllable and predictable polmerization took place.

The desired overall amorphous character in this tetrafunctional poly-BAMO/NMMO was achieved by the timed addition of NMMO (the more reactive monomer) to the reaction solution containing BAMO (the less reactive monomer) and a portion of the NMMO. The observed relative percentages of BAMO and NMMO incorporated were determined by the feed ratio. Either a methanol or an acetonitrile liquid/liquid extraction is used to purify the polymer, thereby helping to ensure a low extractables content. Please see: R. Wardle and R. Biddle, *A Report on the Synthesis and Scale-Up Chemistry of Polyoxetane Thermoplastic Elastomers*, BRL Contract DAAA15-85-C-0037, 16 Dec. 1987 and J. Simon, U.S. Pat. No. 4,511,742, 1985. Acetonitrile is attractive because residual solvent cannot interfere with cure.

TABLE

| Material | Tetrafunctional Polymer Properties | | | |
| --- | --- | --- | --- | --- |
| | BAMO | BAMO | BAMO | BAMO/NMMO |
| Ratio | — | — | — | 71.4/28.6 |
| Target MW | 3,610 | 6,970 | 13,711 | 12,237 |
| VPO MW | 3,902 | 5,860 | 9,574 | 10,548 |
| NMR MW | 4,368 | 5,890 | 10,432 | 11,146 |
| Eq Wt (Titration) | 1,024 | 1,481 | 2,500 | 2,717 |
| Eq Wt (NMR) | 1,092 | 1,575 | 2,760 | 2,858 |
| Init. Inc. (%) | 90 | 100 | 100 | 99 |
| Chains With an Initiator (%) | 100 | 87 | 89 | 95 |
| Mw | 4,270 | 5,410 | 7,840 | 8,650 |
| Mn | 2,620 | 3,310 | 4,420 | 5,360 |
| Polydispersity | 1.63 | 1.63 | 1.75 | 1.61 |
| Functionality (VPO/eq wt) | 3.81 | 3.96 | 3,83 | 3.88 |
| Functionality (NMR) | 4.0 | 3.74 | 3.78 | 3.90 |

The target molecular weight (MW) was determined by dividing the grams of monomer by moles of initiator. The vapor phase osmometry (VPO) molecular weight was measured in chloroform on a Knauer VPO calibrated with benzil using three concentrations of polymer ranging from 10 to 50 g per liter and is corrected for small amounts of oligomer and monomer. The equivalent weight (eq wt) was determined using an isocyanate titration method and by NMR endgroup analysis. The percentage of *initiator incorporated (init. inc.) was determined by NMR comparison of the polymer backbone and initiator resonances in the polymer. The percentage of chains with an initiator was determined by NMR comparison of end-group-to-initiator absorbencies. Mw, Mn and polydispersity were determined by GPC using poly(glycol-adipate) as calibration standard with a series of four columns from 100 to 100,000 angstroms employed for separation. Two measures*of functionality are given, one based on osmometry and titration equivalent data and the other on NMR data. Taken in sum, the data in this table constitute irrefutable proof that the materials possess a functionality of four and were synthesized in a controllable manner.

The initiator system results in molecular weight control being influenced strongly by the monomer/initiator ratio and has been shown experimentally to exhibit the characteristics of a "pseudo-living polymerization" mechanism. In a representative polymerization using this method, small aliquots were removed and quenched at several stages of the polymerization. The polymers were analyzed, and analysis gave a profile of the progression of the reaction. The molecular weight was shown to increase linearly with conversion and a high percentage of the initiator was incorporated into the polymer early in the polymerization with exactly one initiator incorporated per polymer chain. These data support a pseudo-living mechanism. Knowing the critical parameters defining the mechanism of the polymerization has enabled both polymer functionality and molecular weight to be controlled, as well as other important polymer parameters (e.g., polydispersity, relative monomer incorporation, and amorphous character). This control has been verified by producing a number of energetic oxetane polymers of varying molecular weight and functionality.

EXAMPLE 7

Preparation of a Monofunctional BAMO Polymer

To a stirred solution of 0.092 ml (0.89 mmol) of benzyl alcohol in 19.0 ml of $CH_2Cl_2$ were added 0.027 ml (0.22 mmol) of boron trifluoride etherate. After 0.5 h, 4.84 ml (35.7 mmol) of BAMO were added. After 268 h, a small aliquot was removed and diluted with $CDCl_3$. NMR analysis showed the reaction to be essentially complete. The bulk solution was diluted with 50 ml of $CH_2Cl$ and 25 ml of saturated aqueous $NaHCO_3$. The phases were separated and the aqueous phase was extracted with 50 ml of $CH_2Cl_2$. The combined organics were dried ($MgSO_4$) then the solvent was removed under reduced pressure to afford 5.8 g (95.3%) of a white, crystalline solid. The material exhibed the following physical properties:

| PROPERTY | VALUE |
| --- | --- |
| Target Molecular Weight | 6720 |
| Hydroxyl Equivalent Weight | 4201 |
| NMR Molecular Weight | 4901 |
| Alcohols/Chain | 0.722 |
| Alcohol Incorporated | 0.839 |
| GPC Mw | 7160 |
| GPC Mn | 3410 |
| GPC Mw/Mn | 2.10 |

Polymers, such as that produced in Example 7 having a single terminal hydroxyl group are particularly suitable for use as terminal blocks of ABA triblock polymers and $A_nB$ star polymers. Monofunctional polymers may be block linked to multifunctional center block polymers, for example, by the method taught in above-referenced U.S. Pat. No. 4,806,613. If the monofunctional polymer is crystalline at ambient temperature and the center multifunctional block polymer is amorphous, the resulting block polymer may exhibit thermoplastic, elastomeric characteristics. Such thermoplastic elastomeric binders are useful as binders in high-energy compositions, such as propellants, gassifiers, explosives or the like.

While the invention has been described in respect to certain preferred embodiments, modifications obvious to one with ordinary skill in the art may be made without departing from the scope of the present invention.

Various features of the invention are set forth in the following claims.

What is claimed is:

1. A method of polymerizing a cyclic ether monomer which is capable of cationic polymerization comprising
   providing a cyclic ether monomer or mixture of cyclic ether monomers capable of cationic polymerization,
   providing an alcohol and an acid catalyst, the catalyst being effective to cooperate with said alcohol to initiate cationic polymerization of the cyclic ether monomer(s),
   mixing said alcohol and said acid catalyst, and
   bringing such mixture of said alcohol and said acid catalyst into contact with said cyclic ether monomer(s) so as to effect polymerization of said cyclic ether monomer(s),
   the improvement comprising,
   said acid catalyst and said alcohol being provided in an amount such that if said acid catalyst is a Lewis acid, the molar ratio of acid catalyst to hydroxyl group(s) on said alcohol is between about 0.05:1 and about 0.5:1, and if said acid catalyst is a proton acid, the molar ratio of hydrogen ions releasable from said acid to hydroxyl group(s) of said alcohol is between about 0.05:1 and about 0.5:1.

2. A method according to claim 1 wherein said monomer(s) is selected from the group consisting of oxetane, substituted oxetanes, tetrahydrofuran, substituted tetrahydrofurans, and mixtures thereof.

3. A method according to claim 1 wherein said alcohol is a polyol.

4. A method according to claim 3, wherein said alcohol is a diol

5. A method according to claim 3 wherein said alcohol is a triol.

6. A method according to claim 3, wherein said alcohol is a tetraol.

7. A method according to claim 1 wherein said alcohol is a monofunctional primary alcohol, the hydroxyl group of said primary alcohol being on a carbon atom vicinal to an aromatic or unsaturated group.

8. A method according to claim 7 wherein said alcohol is benzyl alcohol or allyl alcohol.

9. The method according to claim 1, wherein said monomer(s) is selected from the group consisting of oxetane, substituted oxetanes, and mixtures thereof.

10. The product of the process of claim 9.

11. The product of the process of claim 9, said product having a polydispersity of less than 2.0 and a controlled functionality number of 3.0 to 4.0

* * * * *

REEXAMINATION CERTIFICATE (2169th)
United States Patent [19]
Wardle et al.

[11] B1 4,988,797

[45] Certificate Issued  Dec. 28, 1993

[54] CATIONIC POLYMERIZATION OF CYCLIC ETHERS

[75] Inventors: Robert B. Wardle; Jerald C. Hinshaw, both of Logan, Utah

[73] Assignee: Thiokol Corporation, Ogden, Utah

Reexamination Request:
No. 90/002,893, Nov. 23, 1992

Reexamination Certificate for:
Patent No.: 4,988,797
Issued: Jan. 29, 1991
Appl. No.: 323,588
Filed: Mar. 14, 1989

[51] Int. Cl.$^5$ .................. C08G 65/10; C08G 65/18; C08G 65/20
[52] U.S. Cl. .................. 528/408; 528/409; 528/410; 528/411; 528/412; 528/414; 528/416; 528/417; 568/617; 568/618
[58] Field of Search ............ 528/408, 409, 410–412, 528/414, 416, 417; 568/617, 618

[56] References Cited

U.S. PATENT DOCUMENTS

| | | | |
|---|---|---|---|
| 2,293,868 | 8/1942 | Toussaint | 260/333 |
| 2,327,053 | 8/1943 | Marple et al. | 260/611 |
| 2,380,185 | 7/1945 | Marple et al. | 260/615 |
| 2,723,294 | 11/1955 | Benoit, Jr. | 260/615 |
| 3,042,666 | 7/1962 | Gentles | 260/209 |
| 3,324,108 | 6/1967 | Moller et al. | 260/209 |
| 3,359,217 | 12/1967 | Brandner | 260/2.5 |
| 3,417,034 | 12/1968 | Hoy | 260/2 |
| 3,954,884 | 5/1976 | Kidwell | 260/615 R |
| 4,112,231 | 9/1978 | Welbull et al. | 544/174 |
| 4,282,387 | 8/1981 | Olstowski et al. | 568/618 |
| 4,359,589 | 11/1982 | Brownscombe | 568/618 |
| 4,405,497 | 9/1983 | Young et al. | 252/431 R |
| 4,477,589 | 10/1984 | van der Hulst et al. | 502/169 |
| 4,481,123 | 11/1984 | Hentschel et al. | 252/52 R |
| 4,879,419 | 11/1989 | Johannessen | 568/606 |

*Primary Examiner*—Melvyn I. Marquis

[57] ABSTRACT

Cyclic ethers having 4 and 5 member rings are polymerized with an alcohol initiator and an acid catalyst. The acid catalyst is used at a molar ratio relative to hydroxyl groups of the alcohol initiator of between about 0.05:1 and about 0.5:1.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 2 and 9 having been finally determined to be unpatentable, are cancelled.

Claims 1, 10 and 11 are determined to be patentable as amended.

Claims 3 to 8, dependent on an amended claim, are determined to be patentable.

1. A method of polymerizing a cyclic ether monomer which is capable of cationic polymerization comprising:
providing a cyclic ether monomer or mixture of cyclic ether monomers capable of cationic polymerization, *wherein said monomer(s) is selected from the group consisting of oxetane, substituted oxetanes, tetrahydrofuran, substituted tetrahydrofurans, and mixtures thereof;* [,]
providing an alcohol and an acid catalyst, the catalyst being effective to cooperate with said alcohol to initiate cationic polymerization of the cyclic ether monomer(s)[,]*;*
mixing said alcohol and said acid catalyst[,]*;* and
bringing such mixture of said alcohol and said acid catalyst into contact with said cyclic ether monomer(s) so as to effect polymerization of said cyclic ether monomer(s)[,]*;*
[the improvement comprising,] *wherein* said acid catalyst and said alcohol [being] *are* provided in an amount such that if said acid catalyst is a Lewis acid, the molar ratio of acid catalyst to hydroxyl group(s) on said alcohol is between about 0.05:1 and about 0.5:1, and if said acid catalyst is a proton acid, the molar ratio of hydrogen ions releasable from said acid to hydroxyl group(s) of said alcohol is between about 0.05:1 and about 0.5:1.

10. The product of the process of claim [9] *1*.

11. The product of the process of claim [9] *1*, said product having a polydispersity of less than 2.0 and a controlled functionality number of 3.0 to 4.0.

* * * * *